United States Patent [19]

Kasper et al.

[11] Patent Number: 4,640,982

[45] Date of Patent: Feb. 3, 1987

[54] CABLE TERMINATION AND METHOD

[75] Inventors: James J. Kasper; John H. Jeffreys, both of Sheffield Lake, Ohio

[73] Assignee: Watteredge-Uniflex, Inc., Avon Lake, Ohio

[21] Appl. No.: 714,910

[22] Filed: Mar. 22, 1985

[51] Int. Cl.[4] .............................................. H02G 15/02

[52] U.S. Cl. .................................... 174/75 R; 29/860; 29/862; 174/15 WF; 174/19; 219/117.1

[58] Field of Search ................. 174/15 WF, 15 C, 19, 174/75 R; 219/137.9, 78.01, 78.16, 117.1; 29/860, 862

[56] References Cited

U.S. PATENT DOCUMENTS

| | | | |
|---|---|---|---|
| 1,584,618 | 5/1926 | Hart | 219/117.1 |
| 3,851,138 | 11/1974 | Metcalfe | 219/78.16 |
| 4,198,111 | 4/1980 | Cappel | 174/15 WF |
| 4,199,653 | 4/1980 | Talley | 174/15 WF |
| 4,493,964 | 1/1985 | Shigemasa | 219/78.01 |

FOREIGN PATENT DOCUMENTS

| | | | |
|---|---|---|---|
| 1049487 | 11/1966 | United Kingdom | 219/117.1 |

*Primary Examiner*—Arthur T. Grimley
*Assistant Examiner*—Morris H. Nimmo
*Attorney, Agent, or Firm*—Renner, Otto, Boisselle & Lyon

[57] ABSTRACT

A DC kickless water cooled cable used in welding is disclosed in which the cable strand ends are crimped into the cable terminations with the aid of a D-clip, and then the D-clip, crimped cable end, and termination are press resistance welded together to form a low cost substantially integral connection.

6 Claims, 4 Drawing Figures

CABLE TERMINATION AND METHOD

DISCLOSURE

This invention relates generally as indicated to a cable termination and method of manufacture and more particularly to a DC kickless water cooled cable used in welding and the method of forming and attaching the cable to the respective termination.

BACKGROUND OF THE INVENTION

Kickless welding cables and more particularly DC kickless water cooled welding cables have been utilized for years. Such cables normally comprise two spirally wound cable conductors with a separator therebetween, such cables being within a hose and connected at each end to the termination which comprises respective machined terminals separated by a gasket. The interconnection between the machine terminals and the cable normally involves a torch silver solder or brazing operation. Such prior art connections are normally quite labor intensive and subject to normal labor intensive defects. Moreover, when exotic materials are employed such as silver, this adds considerably to the cost. Also, because the termination-to-cable connection is subject to considerable stress during use, such connection may come apart during use resulting in low service life for the entire cable as a result of one faulty connection. Moreover, the use of special soldering compositions, etc., can result in a higher resistance connection, particularly if fluxes or compositions other than silver or platinum are used, assuming the parts are made of copper. Thus there is a need for a low resistance cable-termination connection in such water cooled cables which will provide long service life, such low resistance, and which can be manufactured at low cost.

SUMMARY OF THE INVENTION

With the present invention there is provided a DC kickless water cooled cable useful in welding in which the cable strand end is crimped into the cable termination with the aid of a D-clip which is specially constructed for press welding. The D-clip, cable end, and termination are then press resistance welded together to form a low cost yet substantially integral connection between the cable and termination.

The method of manufacture of the present invention includes the step of enclosing the cable end and the termination in the special D-clip, then crimping the same to the required configuration, and then press resistance welding the cable, D-clip, and termination together. Once the cable-termination connection has thus been made, the parts are then assembled to form a DC kickless water cooled cable in accordance with the present invention.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DESCRIPTION OF THE PREFERRED EMBODIMENTS

Figure 1:
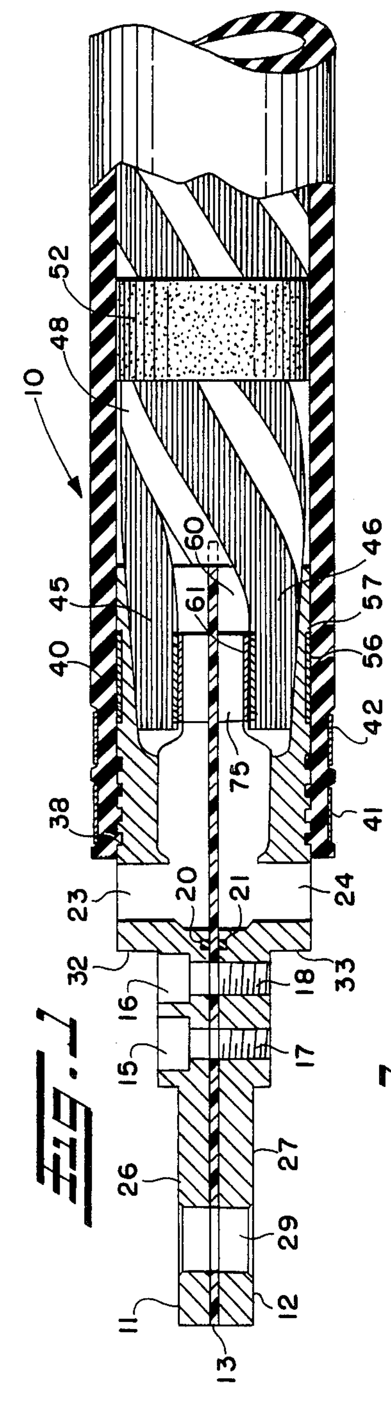
FIG. 1 is a fragmentary elevation broken away and in section of a termination of a cable in accordance with the present invention.

Referring first to FIG. 1 there is illustrated a DC kickless cable 10 in accordance with the present invention. Only one end or termination is illustrated. Such termination includes machined terminals 11 and 12 which are separated by a laminated gasket 13. The terminals are held together by suitable fasteners which fit within the recessed head holes 15 and 16 in the terminal 11 and which are threaded into the tapped holes 17 and 18 in the opposite terminal. Each terminal is provided with a groove in which a suitable seal is provided as indicated at 20 and 21.

The outer end of the opposed terminals has generally flat faces as indicated at 26 and 27 so that the termination may be clamped to a certain fitting primarily through the hole 29.

The terminals inwardly of the shoulders 32 and 33 are semicircular in shape and when combined with the gasket 13 are in summation circular in shape. The O.D. of the terminations inwardly of such shoulders is provided with machined grooves seen at 38 to which is clamped a high voltage hose 40. Such clamping may be obtained by stainless steel banding indicated at 41 and 42.

Figure 4:
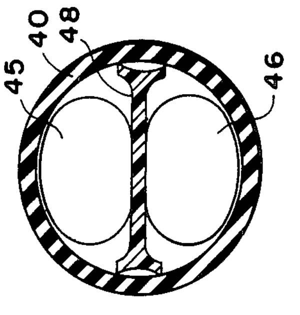
FIG. 4 is a transverse section of the cable illustrating the separator between the two conductors within the cable.
Figure 2:
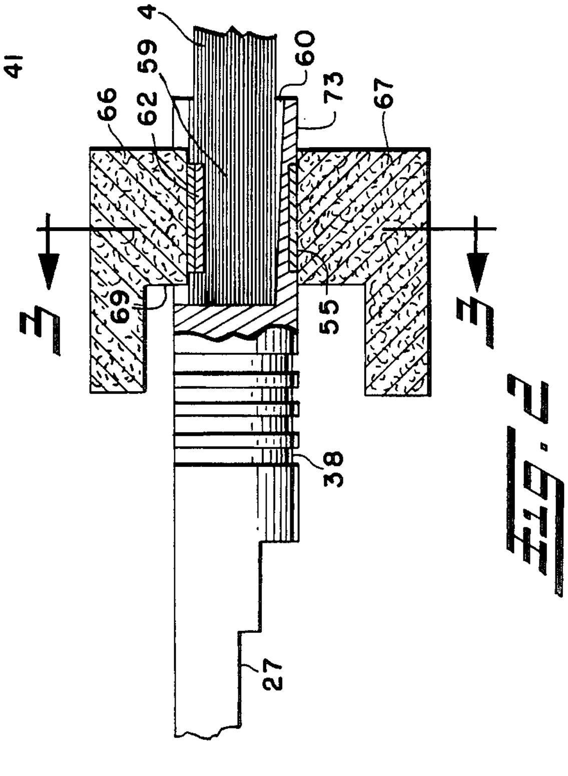
FIG. 2 is a fragmentary vertical section taken through the strand and respective terminal illustrating the press resistance weld connection of the cable to the termination.

The respective terminals 11 and 12 are connected to copper stranding or cables 45 and 46, respectively which extend in a spiral manner within the hose 40 to the opposite similar termination, not illustrated. The cable or stranding is separated by a separator 48, the cross sectional configuration of which is shown more clearly in FIG. 4. Intermittently, the cables and separator within the hose are contained by fiberglass rings indicated at 52 which may comprise laminated tube sections cut with an aluminum coating on the interior to reflect heat. Such fiberglass rings may be on 4" centers, for example.

In the process of forming the terminal-to-cable connection, the cable may be enclosed by a D-ring shown generally at 55. The D-ring initially has a bottom circular portion 56 which fits snugly in shallow groove 57 on the outside of the terminal. The top of the ring in its unformed condition normally is bowed upwardly and the end 59 of the copper strand 46 is inserted into the generally semi-cylindrical cavity or socket 60 at the rear end of the terminal. It is noted that the semi-cylindrical cavity has a tapered interior wall and is slightly larger at the inner end of the terminal. Positioned between the top 61 of the D-ring and the strand end 59 is a fairly thick plate 62 which acts as a balancing heat sink in the subsequent press resistance welding operation.

Figure 3:
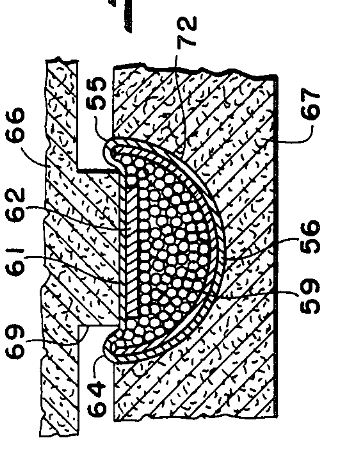
FIG. 3 is a vertical section taken substantially on the line 3—3 of FIG. 2.

After the plate is inserted and in proper position between the top of the D-ring and the strand end, the D-ring and strand end are then compressed or crimped to the shape shown generally in FIG. 3. The groove 57 extends over the edges of the socket 60 such that when the D-ring is folded over the edges of the socket of the terminal as indicated at 64, the top wall of the D-ring becomes horizontal and below or spaced from the now flush parting surface of the terminal, such flush parting surface allowing for the accommodation of electrical insulation between the terminals. After the pressing or crimping operation, the cable or strand is mechanically connected to the terminal. Such mechanical connection is then press resistance welded to form a strong integral connection.

Such press resistance welding is accomplished by placing the terminal and strand connection between electrodes shown generally at 66 and 67 which are part of the press resistance welding machine. Reference may be had to the co-pending application for U.S. Letters Patent of James J. Kasper and Edward Langhenry entitled "Electrical Flexible Jumpers And Method Of Manufacture" Ser. No. 714,971 filed even late herewith for a more detailed disclosure of the press resistance welding machine and technique which may be utilized to form the connection illustrated. The upper electrode 66 is provided with a relatively narrow projection 69 which has a bottom flat face. The lower electrode 67 is provided with a semi-cylindrical cavity or die face 72 designed closely to fit the semi-cylindrical out wall 73 on the inner end of the terminal. As indicated in such co-pending application, the electrodes are machined from refractory blocks such as graphite and are quite hard and able to retain heat.

The connection is first laid in the semi-cylindrical recess 72 of the lower electrode 67 when the press is open or the top electrode 66 is elevated. The top electrode is activated by a pneumatic piston cylinder assembly which is brought downwardly under controlled pressure. The welding cycle then begins passing current between the electrodes and the work clamped therebetween. Suitable stops may be provided limiting penetration of the upper electrode beyond a given point. During the welding cycle the temperature of the connection may be elevated to from approximately 1900° to 2000° F. The plate 62 serves as a heat sink to balance the wall 73 of the terminal which is normally machined from a casting so that the wires of the strand do not heat prematurely and flow excessively. The pressure, current and cycle times are ascertained empirically and may vary depending upon the size of the connection being formed. In any event after the press resistance welding operation the D-clip, plate and terminal are substantially integrally welded to form a very strong yet very low resistance connection. Such connection may be accomplished without brazing or soldering alloys which either increase the cost of the connection and thus the cable or reduce its conductivity.

After the press resistance welding operation the top wall 61 of the D-clip is depressed considerably below the parting line of the terminal or gasket 13 providing a passage so that cooling water may flow through the terminal and down one side of the separator 48 and back the other side.

Because of the avoidance of the labor intensive normal silver soldering or brazing operation, and the cost of such materials, it will be appreciated that the cable of the present invention provides a more secure connection having longer service life with the resistance of a substantially solid copper connection while at the same time being less costly to produce.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A method of forming a cable termination comprising the steps of mechanically connecting a cable to a terminal having a socket formed by a round wall in which said cable end is positioned, and then surrounding said terminal and said cable end with a ring clip, and then pressing said ring clip and said cable end into said socket such that said ring clip is formed into a generally D-shape configuration having a straight wall portion, said straight wall portion being recessed below the edges of said socket, placing the round wall of said socket with said cable end thus mechanically connected thereto in a mating round recess in a refractory electrode of a press resistance welding machine, and then forcing a straight walled refractory electrode against the straight wall portion of said D-shape ring clip while passing current between such electrodes and through said D-shape ring clip, cable, and terminal to elevate said D-shape ring clip, cable, and terminal to a high welding temperature to form a press resistance welded substantially integral connection.

2. A cable assembly comprising a termination including two electrically insulated half terminals each connected to a cable end by a connection, each of said connections comprising a socket formed by a half round wall of said half terminal, said half round wall including a groove with a D-shape mechanically crimped ring clip having a straight wall portion positioned therein, said D-shape mechanically crimped ring clip surrounding and crimping a portion of said cable end and said half terminal, a reinforcing plate positioned between said straight wall portion and said cable end, and a press resistance weld forming a substantially integral connection between said cable end and said half terminal.

3. An electrical cable termination comprising a terminal formed at one end with a reinforcing plate and a cable receiving half round socket which is formed by a half round wall of said terminal, said half round wall including a groove with a ring clip, said ring clip positioned in said groove and surrounding said half round wall, said socket, said reinforcing plate, and said cable end and pressed into a generally D-shape configuration having a straight wall portion such that said reinforcing plate underlies the straight wall portion of the ring clip and is contiguous with the cable end, said groove extending over the edges of said socket to provide a flush edge of said socket and the straight wall portion of the ring clip being recessed below the edges of the socket after said clip is press formed to such generally D shape, and said terminal wall, said ring clip, said reinforcing plate, and said cable end being press resistance welded to form a substantially integral connection between said cable end and said terminal.

4. A kickless cable assembly comprising a termination which includes two half-terminals separated by a gasket, each of said terminals having a socket formed by a half round wall, copper stranding having cable ends connected to said respective sockets of said half terminals spirally extending to the opposite termination separated by a spirally extending separator within a hose sealed to the termination, the improvement comprising the connection between the half terminal and respective stranding which includes a reinforcing plate and a mechanically crimped ring clip surrounding at least a part of said half terminal, said reinforcing plate, and said stranding, said half round wall including a groove surrounding said half round wall adapted to receive said mechanically crimped ring clip and extending over the edges of said socket to form a flush surface for seating of said gasket when the mechanically crimped ring clip is crimped, said mechanically crimped ring clip including a D-shape configuration having a flat wall portion, said flat wall portion being spaced inwardly from the socket edges to form a fluid passage between said flat wall portion and the socket edges, said reinforcing plate being positioned between said flat wall portion of said mechanically crimped ring clip and said cable end, and a press resistance weld substantially integrating the stranding, said reinforcing plate, and said half terminal at said connection.

5. A method as set forth in claim 1 including the step of placing a reinforcing plate between the cable end and the straight wall portion of the D-shape ring clip.

6. A method as set forth in claim 5 including the step of placing the round wall of the socket with the cable thus mechanically connected thereto in a mating round recess in a refractory electrode of a press resistance welding machine, and then forcing a straight walled refractory electrode against the straight wall portion of said D-shape ring clip, while passing current between such electrodes and through said D-shape ring clip, reinforcing plate, cable and terminal to elevate said D-shape ring clip, reinforcing plate, cable and terminal to a high welding temperature to form the pressure resistance welded substantially integral connection.

* * * * *